United States Patent [19]
Tanaka et al.

[11] Patent Number: 5,701,531
[45] Date of Patent: Dec. 23, 1997

[54] FILM FEEDING DEVICE

[75] Inventors: Yoshiharu Tanaka, Sakai; Junichi Tanii, Izumi; Katsuhiro Ono, Sakai, all of Japan

[73] Assignee: Minolta Co., Ltd., Osaka, Japan

[21] Appl. No.: 591,707

[22] Filed: Jan. 25, 1996

[30] Foreign Application Priority Data

Jan. 26, 1995 [JP] Japan .................. 7-010487

[51] Int. Cl.⁶ .................. G03B 17/24; G03B 17/02; G03B 1/00
[52] U.S. Cl. .................. 396/319; 396/387; 396/418; 396/535
[58] Field of Search .................. 354/105, 106, 354/149.11, 484; 396/310, 319, 388, 406, 411, 418, 312, 311, 320, 387, 535

[56] References Cited

U.S. PATENT DOCUMENTS

| | | | |
|---|---|---|---|
| 4,668,070 | 5/1987 | Wakabayashi et al. | 354/484 |
| 4,926,207 | 5/1990 | Eguchi et al. | 354/484 |
| 5,079,584 | 1/1992 | Nakamura | 354/484 |
| 5,155,511 | 10/1992 | Tamamura | 354/76 |
| 5,260,739 | 11/1993 | Nagata | 354/430 |
| 5,361,116 | 11/1994 | Funahashi | 354/403 |

FOREIGN PATENT DOCUMENTS

| | | |
|---|---|---|
| 6332060 | 2/1994 | Japan . |
| 6-118501 | 4/1994 | Japan . |
| 6-265990 | 9/1994 | Japan . |
| 04022937 | 1/1997 | Japan . |

*Primary Examiner*—Safet Metjahic
*Assistant Examiner*—Christopher E. Mahoney
*Attorney, Agent, or Firm*—Sidley & Austin

[57] ABSTRACT

A mechanism, for feeding a film with a photographing information magnetic recording area, of a camera. The camera including the mechanism has a cartridge holder inside which a film cartridge housing the film in is set; an aperture for defining an exposure field on the film; a magnetic head for writing/reading the photographing information; a take-up spool around which the film fed from the film cartridge is wound; and a drive motor for feeding the film between the film cartridge and the take-up spool. Both the take-up spool and the magnetic head are installed on one side of the aperture, and both the cartridge holder and the drive motor are installed on the other side, opposite to the one side in view of the film feeding direction, of the aperture. The drive motor is mounted opposite to the aperture relative to the cartridge holder; therefore, a greater distance is secured between the magnetic head and the motor so that an electromagnetic noise generated from the motor during the writing/reading operation by the magnetic head is effectively reduced on a side of the magnetic head.

20 Claims, 5 Drawing Sheets

FILM FEEDING DEVICE

BACKGROUND OF THE INVENTION

1. Field of the Invention

The present invention generally relates to an apparatus, such as a camera and a film scanner, in which a film, provided with field for recording photographing information such as a date of a picture-taking and a condition of its exposure, is used, and particularly relates to a device for feeding the film.

2. Description of the Related Arts

Conventionally, there has been proposed a film provided with a magnetically recording field for recording a photographing information such as a date of a picture-taking and a condition of its exposure while there has been proposed a camera with a mechanism for writing/reading the photographing information with respect to the field of the film, as presented in, for example, Japanese Laid-Open Patent Publication No. 6-118501. The recording field, for recording the photographing information, of the film is provided longitudinally under a plurality of frames thereof, while the mechanism, for writing/reading the photographing information, of the camera is provided at a position thereof corresponding to the recording field of the film.

Meanwhile, conventionally, there has been provided a camera in which a motor, for feeding a film between a film cartridge and a take-up spool, to wind the film fed out of the film cartridge, mounted on a camera body, is installed inside the take-up spool, whose arrangement contributes to a small size of the camera.

The former camera with the mechanism for writing/reading the photographing information operates in such a way that the photographing information is magnetically written or read while the film is being fed out of the film cartridge to the take-up spool. Because the photographing information must be recorded in the magnetically recording field corresponding to each frame of the film, the mechanism for writing/reading the photographing information is provided between an exposure field in which the film is exposed to light and the take-up spool of the camera.

If the mechanism for writing/reading the photographing information of the former camera is applied to the latter camera, and if the mechanism for writing/reading the photographing information is provided between the exposure field for the film and the take-up spool, then, a small space or interval is left between the mechanism for writing/reading the photographing information and the take-up spool, or between the mechanism and the motor for feeding the film.

According to the arrangement, because the mechanism for writing/reading the photographing information is undesirably affected by an electro-magnetic noise which is generated from the motor inside the take-up spool at time of writing/reading the information, there is a possibility that the mechanism may inaccurately write/read the photographing information relative thereto.

In order to exclude such a possibility, if the mechanism for writing/reading the photographing information or the motor inside the take-up spool is provided with a shield, it would be unavoidable that the camera is of a bigger size and at a high cost.

SUMMARY OF THE INVENTION

Therefore, one object of the present invention is to provide a film feeding device by which the mechanism for writing/reading the photographing information is less affected by the electro-magnetic noise generated from the motor for feeding the film while the mechanism writes or reads the photographing information with respect to the recording field of the film.

Another object of the present invention is to provide the film feeding device which contributes to a small size of a camera, in addition to realizing the above object.

In accomplishing these and other objects of the present invention, there is provided a film feeding device for feeding a film on which photographing information is to be recorded, the film feeding device comprising: a member having an exposure opening that defines an image exposure area on a film; an information communicating device, subject to influence of spurious electro-magnetic noise, which writes or reads the photographing information with respect to the film and which is provided at one side of the exposure opening in view of a film feeding path; a drive motor which is provided at the other side of the exposure opening in view of the film feeding path; and a film feeding mechanism, for feeding the film across the exposure opening along the film feeding path, which is driven by a drive power of the driver motor.

According to this mechanism, the information communicating device and the drive motor are provided on opposite sides of the exposure opening of the member, respectively, so that a greater distance is secured between the information communicating device and the drive motor than a distance between the corresponding device and motor in accordance with a combination of the conventional apparatus described in "Description of the Related Arts".

In other words, with this mechanism, the information communicating device and the drive motor are separated a distance at least corresponding to a length of the exposure opening, to effectively prevent an undesirable interference of the spurious electro-magnetic noise generated from the drive motor relative to the information communicating device, while the information communicating device writes or reads the photographing information with respect to the film.

In this mechanism, it is preferable that the film feeding mechanism has a take-up spool that the fed film is wound around and that is provided at the same side as the information communicating device with respect to the exposure opening, wherein the take-up spool is configured to be cylindrical in shape, and an electronic device other than the drive motor is accommodated inside the take-up spool.

According to this mechanism, the take-up spool functions not only as a member for winding the film for storage, but also as a member for providing a space for an electronic device like a capacitor or battery. That is, if the film feeding device is provided in a camera, the camera is designed in a smaller size, saving such a space for the electronic device.

In this mechanism, the information communicating device may be provided between the exposure opening and the take-up spool, to write or read the photographing information therebetween.

In this mechanism, the film feeding mechanism may have a cartridge holder, for holding a film cartridge that the film is housed in, which is provided at the same side as the drive motor with respect to the exposure opening.

In this mechanism, it is preferable to provide the drive motor so that the film cartridge is positioned between the drive motor and the side of the exposure opening which is opposite the side of the exposure opening which is adjacent to the information communicating device. With this mechanism, the distance between the drive motor and the information communicating device is the greatest; thus, the electromagnetic noise generated in the information communicating device by the drive motor is minimized.

In this mechanism, the film feeding mechanism may have a driving shaft, with a worm, driven by the drive motor; and a worm wheel, engaging with the worm, for transmitting the drive power of the motor to the take-up spool and a driver for driving a spool of the film cartridge.

In this mechanism, the information communicating device may be a magnetic head which writes or reads the photographing information magnetically.

In case that the film feeding device is provided in a camera with a flash light, it is preferable that a light source of the flash light is provided near the take-up spool and that a capacitor for the light source is provided inside the take-up spool.

With this arrangement, an electrical conductor connecting the light source of the flash light to the capacitor is shortened, so that a loss in electrical transmission between them is effectively reduced to a minimal degree.

In this mechanism, it is preferable that the camera has a controller for preventing the capacitor from accumulating electric charge while the magnetic head writes or reads the photographing information.

With this mechanism, during the operation of the information communicating device to write or read the photographing information with respect to the film, an electromagnetic noise is not generated in the information communicating device thus an accurate writing or reading the photographing information can be secured.

As shown above, the film feeding device of the present invention may form a part of a camera.

BRIEF DESCRIPTION OF THE DRAWINGS

These and other objects and features of the present invention will become clear from the following description taken in conjunction with a first, second and third preferred embodiment thereof with reference to the accompanying drawings, in which.

DETAILED DESCRIPTION OF THE PREFERRED EMBODIMENTS

Before the description of the present invention proceeds, it is to be noted that like parts are designated by like reference symbols throughout the accompanying drawings.

Referring to FIGS. 1 through 7, a full description is made below on a camera provided with a film feeding device according to a first, second and third embodiment of the present invention.

First, the description is made below on the camera provided with the film feeding device according to the first embodiment, with reference to FIGS. 1 through 5.

Figure 1:
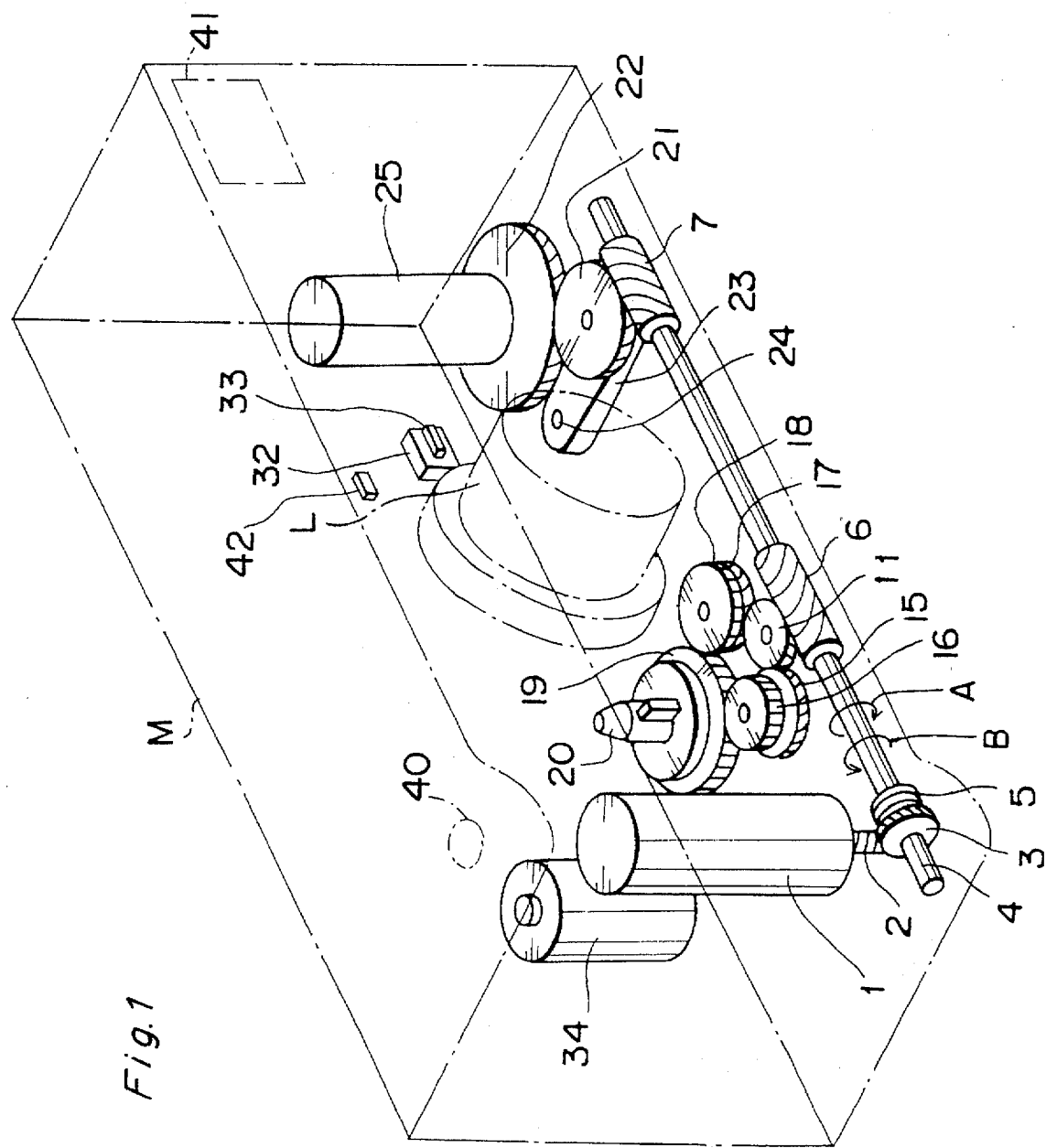
FIG. 1 is a general perspective view showing a camera explanatorily, from its front side, in which a film feeding device according to a first embodiment of the present invention is provided.
Figure 2:
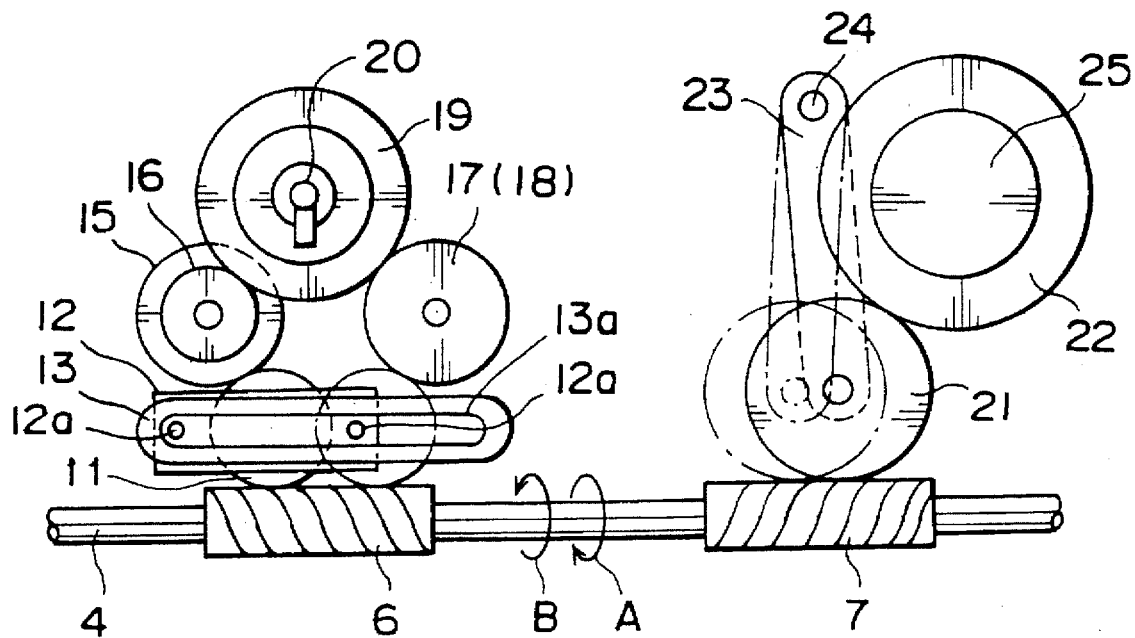
FIG. 2 is an enlarged detail view of a part of the film feeding device shown in FIG. 1.
Figure 3:
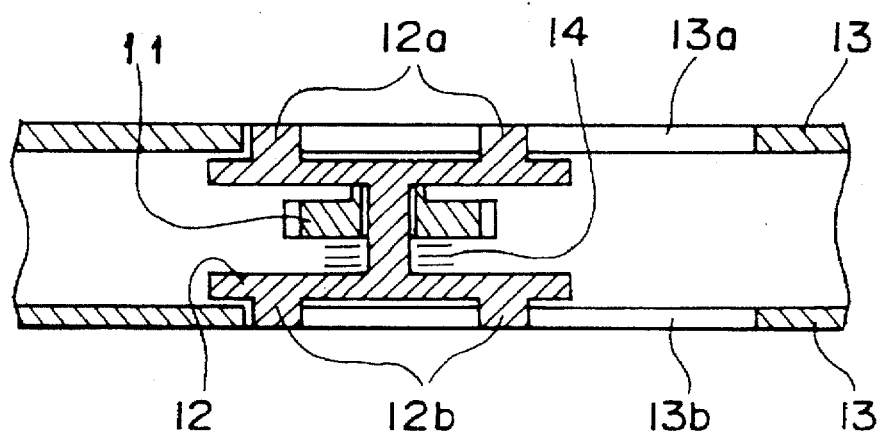
FIG. 3 is an enlarged detail view of a part of the film feeding device shown in FIG. 2.
Figure 4:
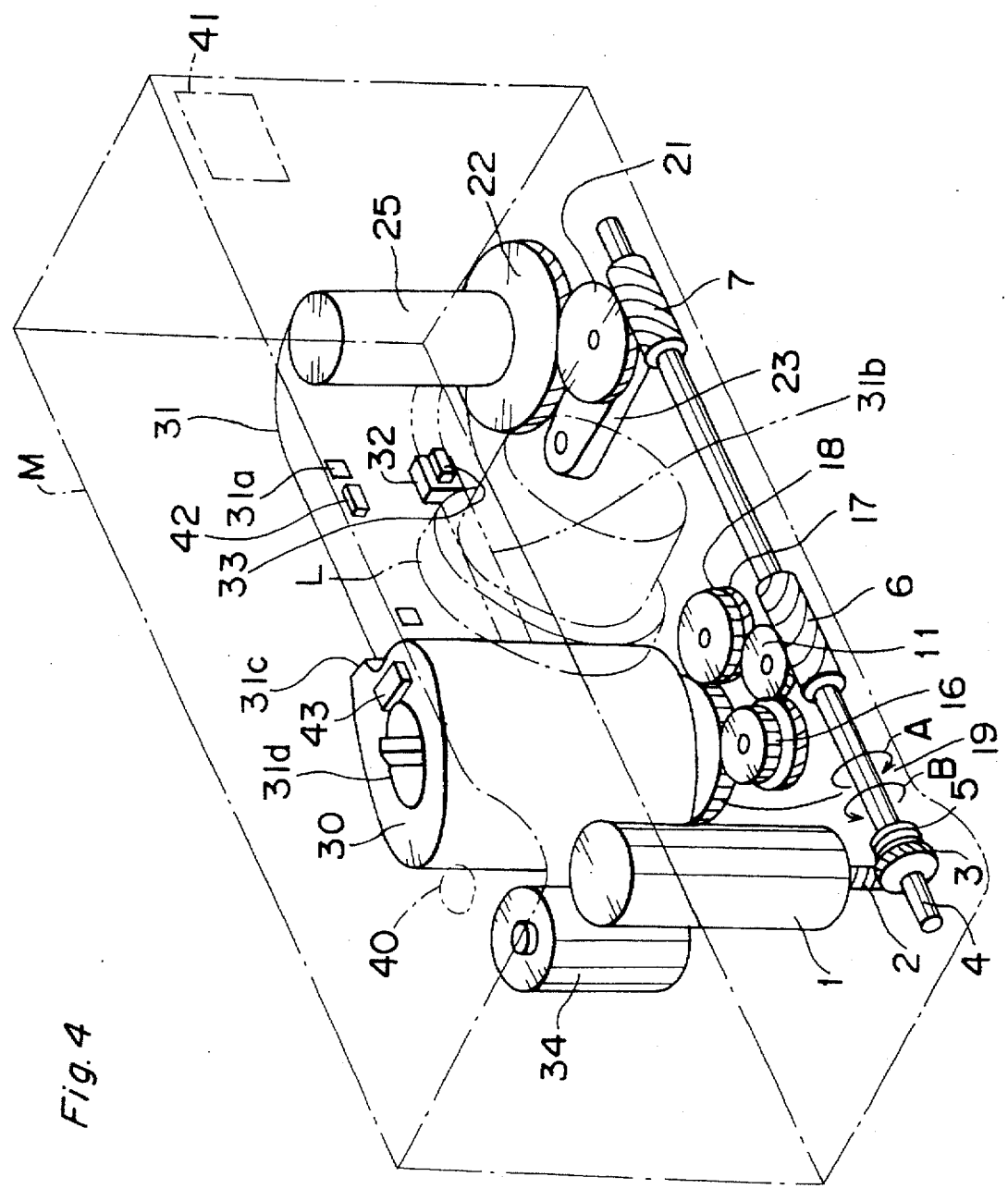
FIG. 4 is a general perspective view, similar to FIG. 1, of the camera which is loaded with a film cartridge, with a part of a film being fed out of the film cartridge.
Figure 5:
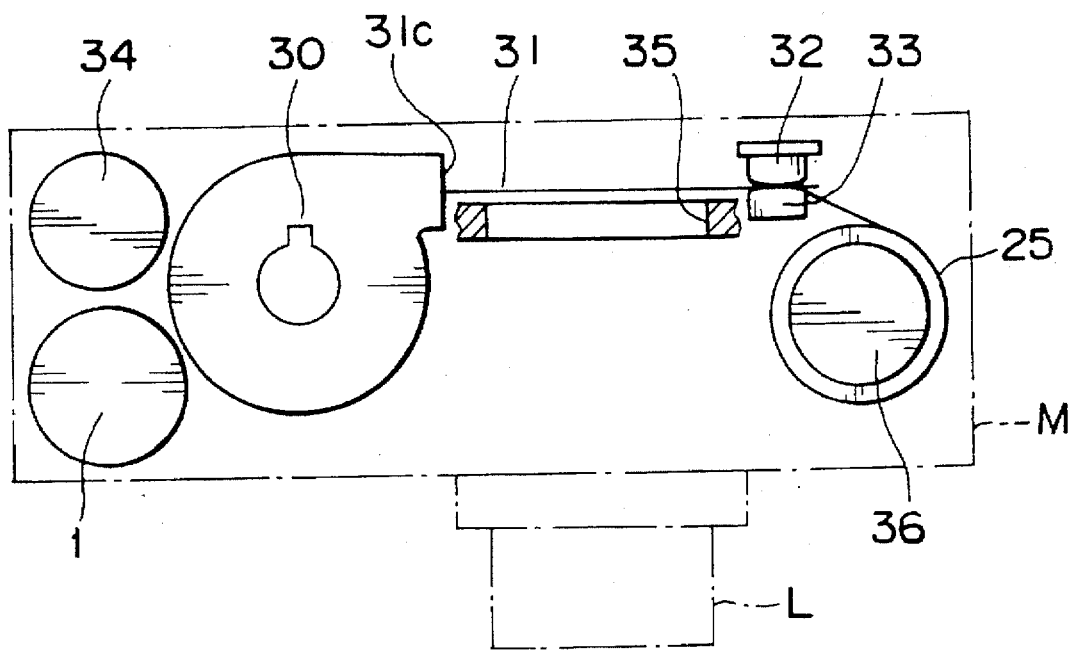
FIG. 5 is an explanatory plan view of the camera shown in FIG. 4.

FIG. 1 is an explanatory, general perspective view of a camera provided with a film feeding device according to the first embodiment, shown from an oblique, front side; FIGS. 2 and 3 are enlarged detail views of parts of the film feeding device of FIG. 1, respectively; FIG. 4 is an explanatory, general perspective view of the camera of FIG. 1, showing that a film cartridge chamber (not shown in the figure) of the camera is loaded with a film cartridge 30 and that a part of a film 31 is fed from the film cartridge 30 with a leader side of the film 31 being wound around a take-up spool 25 of the camera; and FIG. 5 is an explanatory, plan view of the camera shown in FIG. 4.

The film 31 fed out of the film cartridge 30 is provided with a magnetic layer or a photographing information recording area 31b which is formed by applying a magnetic material onto a base of the film 31. As shown by a chain line in FIG. 4, the photographing information recording area 31b is provided longitudinally under each frame of the film 31. With respect to the photographing information recording area 31b, photographing information such as a date of a picture taking, a condition for its exposure, etc. is written or read by a magnetic head 32 being a part of the film feeding device provided on the camera, which is explained later.

In the drawings, a reference numeral 31d points to a driving hole, not circular in shape, for driving a film winding spool which is rotatably mounted in the film cartridge 30; 31c to a film passageway through which the film 31 is fed relative to a case of the film cartridge 30; and 31a to a plurality of perforations for driving and feeding the film 31 between the film cartridge 30 and the take-up spool 25.

The film cartridge 30 illustrated in the embodiment is of a thrust-type of a cartridge so constructed that the film 31 is housed up to its leader inside the cartridge case when the film cartridge 30 is not set in the film cartridge chamber of the camera, and that the film 30 is thrust out through the film passageway 31c by driving the driving hole 31d by a film rewinding driver 20, which is explained later.

Instead of using the thrust-type of the film cartridge, it is also possible to use a normal-type of a film cartridge so constructed that a leader of a film remains a bit outside a film case of the cartridge when the cartridge is not set inside the film cartridge chamber of the camera.

On the other hand, the film feeding device is provided with the magnetic head 32 for writing/reading the photographing information with respect to the photographing information recording area 31b of the film 31.

More specifically, in FIGS. 4 and 5, a chain line shown by a reference symbol M points to a camera body to which the film feeding device is applied; 25 points to the take-up spool for winding the film 31, rotatably mounted on the camera body M; 32 to the magnetic head for writing/reading the photographing information with respect to the photographing information recording area 31b of the film 31 while the film 30 is being fed between the film cartridge 30 and the take-up spool 25; a chain line shown by L to a photographing lens; and 35 to an aperture forming an exposure field in which the film 30 is exposed to light. Here, the film feeding device applied to the camera, comprises the take-up spool 25, the magnetic head 32, and the aperture 35.

As illustrated in FIG. 5, the exposure field is provided in a location between the film cartridge 30 and the take-up spool 25, and the magnetic head 32 is provided in a location between the exposure field and the take-up spool 25. In the figure, 33 indicates a pad by which a film surface, coated with a photographic emulsion, corresponding to the photographing information recording area 31b, is pushed against the magnetic head 32 with a moderate degree of force in order to secure a flatness of the film surface relative to the magnetic head 32. The pad 33 is thus biased relative to the magnetic head 32 by a biasing means (not shown in the figure).

The film feeding device comprises a film feeding motor which is adjacent to the cartridge 30, and a battery. In FIGS. 1 and 4, the reference numeral 1 points to the motor which is installed, in the front of the camera body M, so that the film cartridge 30 is between the drive motor 1 and the closest side of the exposure field aperture 35, and 34 points to the battery which is disposed, adjacent to the motor 1 and in the back of the camera body M, so that the film cartridge 30 is between the battery 34 and the closest side of the exposure field aperture 35.

The film feeding device also comprises a system of gears or a driving mechanism, as follows.

The motor 1 has a driving shaft to which a worm gear 2 is fixed, and the film feeding device has a film rewinding driver 20 which rotates the driving hole 31d of the film cartridge 30. The film feeding device is so constructed that as the worm gear 2 rotates, the film rewinding driver 20 and the take-up spool 25 are driven, respectively, by its rotation.

As illustrated in the figures, the magnetic head 32 is located nearer to the take-up spool 25 than to the film cartridge 30, and the motor 1 is located nearer to the film cartridge 30 than to the take-up spool 25.

In the figures, a reference numeral 3 points to a worm wheel which engages with the worm gear 2 of the driving shaft of the motor 1; 4 to a long driving shaft which is rotatably mounted, in the front and the underside of the camera body M; 5 to a conventional friction clutch which transmits the rotation of the worm wheel 3 to the driving shaft 4; and both 6 and 7 are worm gears fixed to the driving shaft 4.

With this construction, the rotation of the worm gear 2 of the motor 1 is transmitted to the driving shaft 4 via the worm wheel 3 and the friction clutch 5. Thanks to the friction clutch 5, if too much working load is exerted upon either the film rewinding driver 20 or the take-up spool 25 under some reason, a connection between the worm wheel 3 and the driving shaft 4 breaks, so that the driving mechanism, being a part of the film feeding device, which includes all the gears, wheels, shafts and the motor 1 installed in the camera body M is protected against its damage.

Furthermore, in FIGS. 1 to 3, 11 points to a first worm wheel which engages with the worm gear 6; 12 to a supporting member which rotatably supports the worm wheel 11; 12a and 12b are guiding projections which project upwardly and downwardly respectively from the supporting member 12; 13 to a guiding base member which is fixed to the camera body M; 13a and 13b are slits which are formed in the guiding base member 13 and which cooperate to guide the guiding projections 12a and 12b of the supporting member 12 in the longitudinal direction of the worm gear 6; 14 to a coiled spring which is springily sandwiched between the first worm wheel 11 and the supporting member 12 in order to exert some friction upon the first worm wheel 11, at time of its rotation, with respect to the supporting member 12; 15 to a first toothed wheel which engages with the first worm wheel 11; 16 to a first spur gear which is mounted on a surface of the first toothed wheel 15 via a conventional one way clutch that allows the first spur wheel 16 to rotate only in a counterclockwise direction relative to the first toothed wheel 15; 17 to a second toothed wheel which engages with the first worm wheel 11; 18 to a second spur wheel which is fixed to a surface of the second toothed wheel 17; 20 to the above-mentioned film rewinding driver provided with a claw or a projection which engages with the driving hole 31d of the film cartridge 30; and 19 to a third toothed wheel which is fixed to a lower surface of the film rewinding driver 20 and which engages with both the first spur wheel 16 and this second spur wheel 18.

With the construction, when the driving shaft 4 is rotated in a direction shown by the arrow A, the first worm wheel 11 is moved, in a left direction relative to the figure, to engage with the first toothed wheel 15, and then the first worm wheel 11 rotates the first toothed wheel 15 in a counterclockwise direction with the first toothed wheel 15 engaging with the first worm wheel 11.

At the same time, the rotation of the first toothed wheel 15 is transmitted to the spur wheel 16 which in turn rotates both the third toothed wheel 19 and the film rewinding driver 20 in a clockwise direction, the clockwise rotational direction corresponding to a rotational direction of the driving hole 31d of the film cartridge 30 by which the film 31 is pushed or thrust out of the case of the film cartridge 30 to feed the leader of the film 31 towards the take-up spool 25.

On the other hand, when the driving shaft 4 is rotated in a direction shown by the arrow B, the first worm wheel 11 is moved, in a right direction relative to the figure, to engage with the second toothed wheel 17, and then the first worm wheel 11 rotates both the second toothed wheel 17 and the second spur wheel 18 in a clockwise direction with the second toothed wheel 17 engaging with the first worm wheel 11.

At the same time, the rotation of the second spur wheel 18 is transmitted to the third toothed wheel 19 to rotate it together with the film rewinding driver 20 in a counterclockwise direction, the counterclockwise rotational direction corresponding to a rotational direction of the driving hole 31d of the film cartridge 30 by which the film 31 is rewound inside the case of the film cartridge 30.

As illustrated in FIGS. 1, 2 and 4, there are mounted other wheels, being a part of the system of gears or the driving mechanism, adjacent the take-up spool 25. That is, in the figures, 21 points to a second worm wheel which can engage with the worm gear 7; 23 to a swinging arm, supported by the camera body M at a pivot pin 24 in such a swinging manner that allows one end opposite the pivot pin 24 of the arm 23 to be movable along the length of the worm gear 7 to some extent, which rotatably supports the second worm wheel 21 at the one end opposite the pivot pin 24, with conventional friction means being sandwiched between the second worm wheel 21 and the swinging arm 23; and 22 to a fourth toothed wheel which is fixed to the take-up spool 25. Inside the take-up spool 25, a main electrical condenser or capacitor 36 for a flash 41, being a part of the film feeding device, is provided as shown in FIG. 5.

In this connection, the camera is provided with a an electronic control system so functioning that a charging of electricity to the capacitor 36 is prevented while the photographing information is being written or read by the magnetic head 32 relative to the photographing information recording area 31b of the film 31.

Under this control, it is surely prevented that an electromagnetic noise generated during the electrical charging to the capacitor 36 undesirably affects the operation of the magnetic head 32 to write or read the photographing information with respect to the film 31.

With this construction, when the driving shaft 4 rotates in a direction shown by the arrow A in FIGS. 1 and 2, the second worm wheel 21 is pushed by the worm gear 7, so that the swinging arm 23 rotates together with the second worm wheel 21 around the pivot pin 24 in a counterclockwise direction. As a result of this rotation, the second worm wheel 21 gets engaged with the fourth toothed wheel 22, and the fourth toothed wheel 22 is rotated in a clockwise direction with the fourth toothed wheel 22 engaging with the second worm wheel 21. As apparent from the figures, the clockwise rotational direction of the take-up spool 25 corresponds to a direction which allows the film 31 to be wound up around the spool itself.

Meanwhile, when the driving shaft 4 rotates in a direction shown by the arrow B in FIGS. 1 and 2, the second worm wheel 21 together with the swinging arm 23 is rotated in a clockwise direction with respect to the pivot pin 24, so that the second toothed wheel 21 is disengaged from the fourth toothed wheel 22.

By the way, the camera is provided with a first detecting device 42 which detects the perforation 31a of the film 31, and a second detecting device 43 which detects, from a mechanism (not shown) installed outside the case of the film cartridge 30, whether all the frames of the film 31 are exposed or not.

Here, it is explained about an operation of prewinding the film 31 from the case of the film cartridge 30 towards the take-up spool 25, when the camera is loaded with a new film cartridge 31 with no frame exposed yet.

First, as shown in FIG. 4, when the camera is loaded with the film cartridge 30, and a film winding signal is outputted from the electronic control system, with the film winding driver 20 of the film feeding device being engaged with the driving hole 31d of the film cartridge 30, the motor 1 starts rotating so that the driving shaft 4 is driven by the motor 1 in a rotational direction shown by the arrow A in FIG. 1. The rotation of the driving shaft 4 rotates the worm gear 6 in the same rotational direction, which in turn moves the first worm wheel 11 in the left direction relative to the figure. When the first worm wheel 11 reaches its extremity in the left direction, then, the first spur wheel 16 is driven to rotate in the counterclockwise direction with the first toothed wheel 15 being engaged with the first worm wheel 11. This rotation drives both the third toothed wheel 19 and the film rewinding driver 20 in the clockwise rotational direction, which in turn drives the driving hole 31d of the film cartridge 30. As a result, the film 30 is pushed or thrust outside the case of the film cartridge 30, and the leader of the film 31 is fed from the film cartridge 30 towards the take-up spool 25.

On the other hand, the rotation of the driving shaft 4 is also transmitted to the worm gear 7, which moves the second worm wheel 21 together with the swinging arm 23 in a counterclockwise direction with respect to the pivot pin 24. As a result, the second worm wheel 21 is engaged with the fourth toothed wheel 22 to drive it together with the take-up spool 25 in a clockwise rotational direction, during which time the leader of the film 31 is wound up around the take-up spool 25.

When the first detecting device 42 detects the perforation 31a of the film 31 while the film 31 is being wound up around the take-up spool 25, the motor 1 is braked to stop so as to set a first frame of the film 31 to the exposure field. At this moment, the pre-winding operation comes to an end.

Next, it is explained about an operation carried out when the camera is loaded with a film cartridge 31 some frames of which are already exposed.

First, when the second detecting device 43 detects that some frames of the film 31 of the cartridge 30 set inside the cartridge chamber are already exposed, a film winding signal is outputted from the electronic control system.

Then, a film winding operation similar to the above mentioned operation, is accomplished. During the film winding operation by which the film 31 is fed from the film case of the cartridge 30 to the take-up spool 25, the magnetic head 32 reads the photographing information recorded in the photographing information recording area 31b of the film 31.

Here, the photographing information recording area 31b is recorded with a magnetic information if the frame is already exposed, while the photographing information recording area 31b is recorded with no magnetic information if the frame is not exposed yet.

Under this condition, if the magnetic head 32 detects that no magnetic information is recorded in the photographing information recording area 31b corresponding to a particular frame of the film 31, the film feeding operation is stopped. At this moment, however, the foremost non-exposure frame of the film 31 already passes the exposure field defined by the aperture 35, and the second non-exposure frame following the foremost non-exposure frame is set with respect to the exposure field.

Consequently, in order to set the foremost non-exposure frame of the film 31 to the exposure field of the film feeding device, the film 31 is rewound back inside the case of the film cartridge 31, just by one frame.

According to this embodiment, in case that the camera is loaded with a film cartridge 30 with some frames already exposed, the operation to set the foremost non-exposure frame of the film to the exposure field is accomplished by rewinding the film 31 back to the film cartridge 30 by one frame. Therefore, the non-exposure frame of the film is positioned relative to the exposure field on a basis of the film rewinding direction from the take-up spool 25 to the film cartridge 30. Meanwhile, in case that the camera is loaded with a film cartridge 30 which has no frames exposed, the non-exposure frame of the film is positioned relative to the exposure field on a basis of the direction in which the film 31 is fed from the film cartridge 30 to the take-up spool 25, because of no need for the film rewinding operation to make the film move backwardly toward the film cartridge. In other words, based upon the condition if the loaded-in cartridge has no frame exposed or not, different directions for positioning a particular frame of the film 31 with respect to the exposure field are used as standards.

As a modification to the film positioning operation, it is also possible to control the operation as follows.

First, the film 31 is fed out of the film cartridge 30 towards the take-up spool 25 by one extra frame of the film, and then the film 31 is rewound back to the film cartridge 30 by two frames. At this time, the foremost non-exposure frame of the film 30 is set short of the exposure field of the film feeding device just by one frame. Next, the film 31 is fed from the cartridge 30 towards the take-up spool 25 by one frame, so that the foremost non-exposure frame is set to the exposure field thereof.

With the control, the non-exposure frame of the film is positioned relative to the exposure field of the film feeding device, always on a basis of the direction in which the film 31 is fed from the cartridge 30 towards the take-up spool 25, no matter whether or not the loaded-in cartridge has a frame exposed to light. Adopting the film positioning operation according to the modification, the positioning of the non-exposure frame of the film with respect to the exposure field is carried out accurately.

In accordance to the film feeding device of this embodiment, the magnetic head 32 is separated from the motor 1 with the exposure field and the film cartridge 30 therebetween; therefore, the magnetic head 32 escapes effectively from the electro-magnetic noise generated by the motor. Consequently, if, for example, the camera is loaded with the film cartridge 30 with some frames already exposed, the magnetic head 32 can read magnetic information correctly and the non-exposure frame of the film is positioned precisely with respect to the exposure field of the film feeding device.

Next, it is explained about a shutter releasing operation of the camera below.

First, when operating a shutter button 40 shown by a chain line in FIGS. 1 and 4, a releasing signal is outputted to expose a frame of the film 31, set on the exposure field, to light which comes through a photographing lens L of the camera.

Then, the electronic control system outputs a film winding signal to actuate the motor 1 for feeding the film 31 from the case of the film cartridge 30 to the take-up spool 25.

Then, if the first detecting device 42 detects the perforation 31a, corresponding to the next frame of the film 31 to be exposed, the motor 1 is braked to stop the film winding operation. During the film winding operation, a magnetically recording circuit (not shown) operates so that the photographing information is recorded in the photographing information recording area 31b of the film 31 by the magnetic head 32 which is pushed against the film surface corresponding to the photographing information recording area 31b.

Because the magnetic head 32 is located apart from the motor 1 with the interval corresponding to the exposure field and the film cartridge 30, the magnetic head is less affected by the electro-magnetic noise generated by the motor 1, thus realizing a precise writing of the photographing information with respect to the film 31.

In this embodiment, the film feeding device is provided with only one magnetic head 32 which is used for both writing and reading the photographing information. Instead of this arrangement, it is also possible to mount a pair of magnetic heads in the device: one for writing the photographing information, and the other for reading it.

In this embodiment, each wheel 11, 15, 16, 17, 18, 19, 21, 22 and each gear 6, 7 is so constructed that the film winding speed of the take-up spool 25 is greater than the film unwinding speed of the film rewinding driver 20 or the spool of the film cartridge when feeding the film 31 from the film cartridge 30 towards the take-up spool 25, thus preventing a tangle of the film 31.

As more film 31 is fed from the film cartridge 30 to the take-up spool 25, the film winding speed by the take-up spool 25 gets greater because of the expansion of the film winding radius on the side of the take-up spool 25. Proportionally to the greater speed thereof, all the film 31 existing over its length tends to be exerted on by a greater tension between the film cartridge 30 and the take-up spool 25. However, since the first spur wheel 16 is connected with the first toothed wheel 15 via a one way clutch as mentioned above, the film rewinding driver 20 can freely rotate in accordance with the film winding speed from the film cartridge 30 towards the take-up spool 25. As a result of this operation, the film 31 is prevented from being cut somewhere during the film winding operation.

Next, it is explained about the film rewinding operation of the film feeding device below.

First, as a film rewinding signal is outputted, the motor 1 is so actuated as to rotate its driving shaft in a reverse direction, which also drives the driving shaft 4 in a reverse direction, which is shown by an arrow B in the figures.

The reverse rotation of the driving shaft 4 is transmitted to the worm gear 6 to move the first worm wheel 11 in a right direction relative to the FIGS. 1 and 2. When the first worm wheel 11 is moved to its right extremity, the first worm wheel 11 comes to engage with the second toothed wheel 17 to rotate the second toothed wheel 17 in the clockwise direction. The clockwise rotation of the second toothed wheel 17, in turn, rotates the film rewinding driver 20 in the counterclockwise direction which corresponds to the rotational direction of the driving hole 31d of the film cartridge 30 in which the film 31 is fed back to the cartridge 30 from the take-up spool 25.

Meanwhile, the rotation of the driving shaft 4 is also transmitted to the worm gear 7 to rotate the second worm wheel 21 together with the swinging arm 23, relative to the pivot pin 24, in the clockwise direction. At this time, the second worm wheel 21 is disengaged from the fourth toothed wheel 22 to let the fourth toothed wheel 22 be free to rotate. Accordingly, when the driving hole 31d of the film cartridge 31 is driven by the film winding driver 20, the take-up spool 25 is free to rotate at the rewinding speed of the film 31 towards the film cartridge 30.

In this embodiment, a capacitor 36 for a flashbulb is housed inside the take-up spool 25; a battery 34 is set so that the film cartridge 30 is between the battery 34 and the exposure field; a shutter button 40 is mounted on the camera body beside the battery 30; and a flash 41 is mounted on the camera body beside the take-up spool 25. Here, the film feeding device comprises the capacitor 36 and the battery 34.

With this arrangement, a shielding of a light-emitting part of the flash 41, with a finger or fingers, of a user operating the shutter button 40, is surely prevented at time of releasing the shutter, thus making the camera convenient in handling.

Furthermore, with this arrangement, because the capacitor 36 is located adjacent to the flash 41, a loss in transmission of an electrical current from the capacitor 36 to the flash 41 is effectively reduced.

As a modification to this embodiment, it is also possible to construct the film feeding device as follows.

The capacitor can be mounted so that the film cartridge 30 is between the capacitor and the exposure field, and the battery can be mounted inside the take-up spool.

With this arrangement, ignoring the inner diameter of the take-up spool, the capacitor mounted on the camera body can be freely designed with any voluntary diameter, which allows the capacitor to be designed in a bigger size with a greater capacity of electrical storage, in order to emit light with a greater lumen through its corresponding flash. With this arrangement, it is preferable to mount a shutter button beside the take-up spool, and to mount a flash beside the film cartridge in order to reduce the loss in transmission of an electrical current from the capacitor to the flash.

Next, a description is made below on a camera in which the film feeding device according to the second embodiment is provided, with reference to FIG. 6, and on a camera in which the film feeding device according to the third embodiment is provided, with reference to FIG. 7.

In the figures, in respect of a member similar to the member illustrated in the first embodiment, the reference number is changed into a three-digit number, and an alphabetic character "a" or "b" is suffixed to each three-digit number, in order to indicate a one-to-one correspondence between them. Also, in respect of a member that is indicated by an alphabetic capital letter in the first embodiment, an alphabetic lower case character "a" or "b" is added after the alphabetic capital letter, in order to specify a one-to-one correspondence between them.

Figure 6:
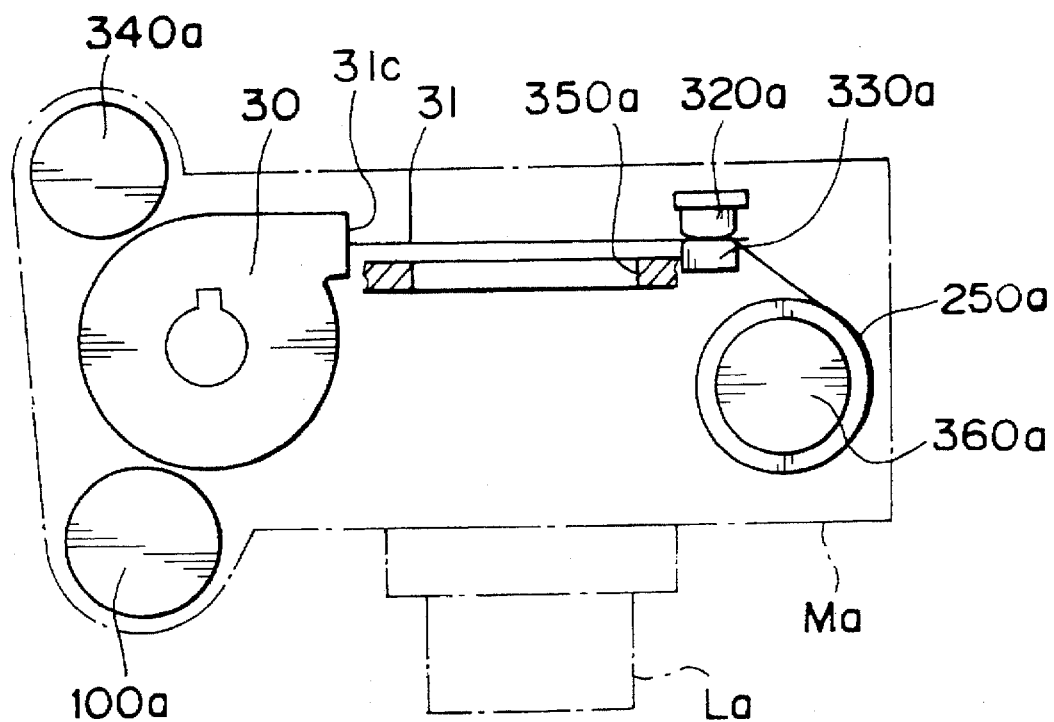
FIG. 6 is an explanatory plan view of a camera in which a film feeding device according to a second embodiment of the present invention is provided.

As shown in FIG. 6, the camera to which the film feeding device according to the second embodiment is applied has a camera body Ma whose parts corresponding to a motor 100a and a battery 340a are projected forward and backward, respectively, to provide a grip for a user's hand to easily hold the camera body Ma.

Figure 7:
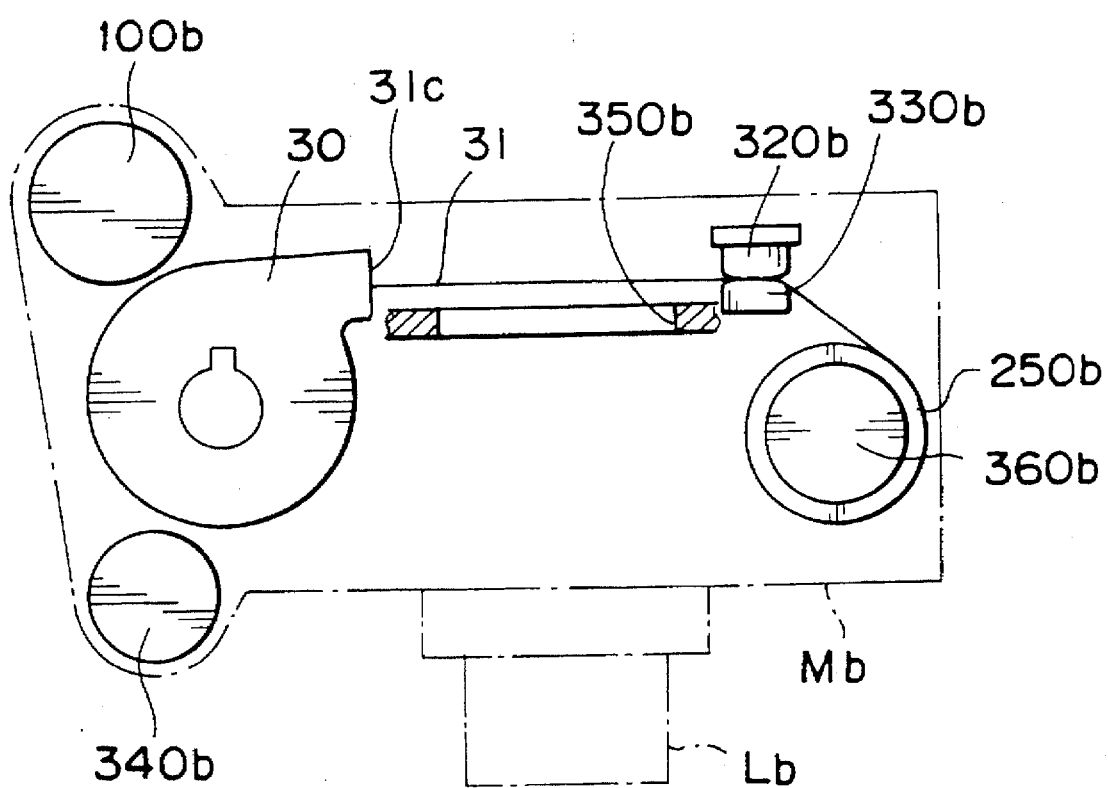
FIG. 7 is an explanatory plan view of a camera in which a film feeding device according to a third embodiment of the present invention is provided.

On the other hand, as shown in FIG. 7, the camera, in which the film feeding device according to the third embodiment is provided, has a camera body Mb, constructed similarly to the camera body Ma of the second embodiment, parts of which are formed as projections to provide a grip for a user's hand to easily hold the camera body Mb. The camera has a construction in which the battery 340a and the motor 100a of the second embodiment are reversed in position; namely, a battery 340b is set in the front portion of the camera body Mb, and a motor 100b is mounted in the back portion thereof, because the motor 100a or 100b is arranged so that the film cartridge 30 is between the motor and the closest side of the exposure field defined by the aperture 350a or 350b, a greater distance is secured between the motor 100a, 100b and a magnetic head 320a, 320b.

With this arrangement, an electro-magnetic noise generated by the motor 100a and 100b is so effectively reduced relative to the magnetic head 320a and 320b that a precise operation to write/read the photographing information, by the magnetic head 320a and 320b, with respect to the photographing information recording area 31b of the film 31, is realized.

Comparing the second and third embodiments illustrated in FIGS. 6 and 7 with each other, the electro-magnetic noise relative to the magnetic head of the second embodiment shown in FIG. 6 is more effectively reduced than that of the third embodiment shown in FIG. 7, because the distance between the motor 100a and the magnetic head 320a according to the second embodiment is greater than that between the motor 100b and the magnetic head 320b according to the third embodiment of the film feeding device.

Generally speaking, the intensity of the electromagnetic noise, generated from the motor when it operates, is inversely proportional to an exponential function of a distance from the motor; consequently, the more separated in linear distance from the motor, the more efficiently reduced the magnetic noise relative to the magnetic head.

According to the present invention, since the magnetic head is separated from the motor with a distance greater than that at least corresponding to the length of the exposure field, the magnetic noise from the motor with respect to the magnetic head is effectively lessened.

The film feeding devices according to all the embodiments and modifications are applied to the cameras, as mentioned above. However, the field to which the film feeding device of the present invention is applied is not limited to the camera. For example, the film feeding device may also be applied to a film scanner in which a film image is converted to an electrical signal.

Also, the medium used for the film feeding device is not limited to the recording medium like the photographing film mentioned above. For example, the film feeding device may also be used with other types of recording media like a magnetic tape.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A film feeding device for feeding a film, on which photographing information is to be recorded, from a film cartridge, containing the film, along a film feed path to a take-up spool, said device comprising:

said take-up spool;

a body for supporting said take-up spool, said body being adapted to receive the film cartridge;

a member having an exposure opening, said member being supported in said body so that said exposure opening defines an image exposure area on the film when the film is positioned in the film feed path, said exposure opening having an upstream side and a downstream side with reference to movement of the film along the film feed path from a thus received film cartridge to said take-up spool;

an information communicating device which is subject to influence of spurious electro-magnetic noise, which writes or reads the photographing information with respect to the film positioned in the film feed path, and which is positioned adjacent said downstream side of the exposure opening;

a drive motor which is supported in said body at a position such that a thus received film cartridge would be positioned between the drive motor and said upstream side of the exposure opening so that said information communicating device is separated from said motor by an interval generally corresponding to said exposure opening and the thus received film cartridge; and a film feeding mechanism, for feeding the film across the exposure opening along the film feeding path, said film feeding mechanism being driven by a drive power of the drive motor.

2. The film feeding device according to claim 1, wherein the information communicating device is provided between the downstream side of the exposure opening and the take-up spool.

3. The film feeding device according to claim 1, wherein the take-up spool is configured to be cylindrical in shape, and wherein an electronic device other than the drive motor is accommodated inside the take-up spool.

4. The film feeding device according to claim 1, wherein the film feeding mechanism includes a cartridge holder, for holding a film cartridge.

5. The film feeding device according to claim 1, wherein the film feeding mechanism comprises a driving shaft, with a worm, driven by the drive motor; and a worm wheel, engaging with the worm, for transmitting the drive power of the drive motor to the take-up spool and a driver for driving a spool of the film cartridge.

6. The film feeding device according to claim 1, wherein the information communicating device is a magnetic head which writes or reads the photographing information magnetically.

7. A camera which includes a film feeding device according to claim 1.

8. A film feeding device for feeding along a film feed path a film on which photographing information is to be recorded, said device comprising:

a cartridge holder for holding a film cartridge which has a film inside;

a take-up spool around which the film, fed out of the film cartridge and along the film feed path, can be wound;

an information communicating device, for writing or reading the photographing information relative to the film, said information communicating device being provided adjacent to the take-up spool; and a driving motor, for feeding the film between the film cartridge and the take-up spool, which is provided adjacent to the cartridge holder.

9. The film feeding device according to claim 8, wherein the information communicating device is provided at a first location at which a distance between the information communicating device and the take-up spool is shorter than a distance between the information communicating device and the cartridge holder, wherein the driving motor is provided at a second location at which a distance between the driving motor and the information communicating device is greater than a distance between the cartridge holder and the information communicating device.

10. The film feeding device according to claim 8, wherein the take-up spool and the information communicating device are provided on one side of the cartridge holder, and the driving motor is provided on another side, opposite to the one side, of the cartridge holder.

11. The film feeding device according to claim 8, further comprising a mechanism for transmitting a drive power from the driving motor to the take-up spool.

12. The film feeding device according to claim 11, wherein the mechanism comprises a driving shaft, with a worm, driven by the drive power from the driving motor; and a worm wheel, engaging with the worm, for transmitting the drive power from the driving motor to the take-up spool and to a driver for driving a spool of the film cartridge.

13. The film feeding device according to claim 8, wherein the take-up spool is configured to be cylindrical in shape, and wherein an electronic device other than the driving motor is accommodated inside the take-up spool.

14. The film feeding device according to claim 8, wherein the information communicating device is a magnetic head which writes or reads the photographing information magnetically.

15. A camera which includes a film feeding device according to claim 8.

16. A camera which includes a film feeding device for feeding a film, said film feeding device comprising:

a cartridge holder for holding a film cartridge which has a film inside;

a cylindrically shaped take-up spool around which the film fed out of the film cartridge can be wound;

a magnetic head, for writing or reading photographing information with respect to the film, which is provided near the take-up spool; and a driving motor, for feeding the film, said driving motor being positioned so that the cartridge holder is between the driving motor and the magnetic head.

17. A camera according to claim 16, wherein the camera also includes a member having an exposure opening for defining an image exposure field on the film, and wherein the magnetic head is provided between the exposure opening and the take-up spool.

18. A camera according to claim 16, wherein the camera further includes a flash light; a light source of the flash light; and a capacitor for the light source, said capacitor being provided inside the take-up spool.

19. A camera according to claim 18, wherein the camera further includes a controller for preventing the capacitor from accumulating electric charge while the magnetic head writes or reads the photographing information.

20. A camera according to claim 16, wherein a battery is provided inside the take-up spool.

* * * * *